United States Patent [19]

Kunzinger

[11] Patent Number: 4,599,720
[45] Date of Patent: Jul. 8, 1986

[54] SATELLITE COMMUNICATIONS SYSTEM

[75] Inventor: Charles A. Kunzinger, Morrisville, N.C.

[73] Assignee: International Business Machines Corporation, Armonk, N.Y.

[21] Appl. No.: 395,200

[22] Filed: Jul. 6, 1982

[51] Int. Cl.$^4$ .............................................. H04J 3/06
[52] U.S. Cl. .................................................... 370/104
[58] Field of Search ................................ 370/104, 103

[56] References Cited

U.S. PATENT DOCUMENTS

| | | | |
|---|---|---|---|
| Re. 28,577 | 10/1975 | Schmidt | 370/104 |
| 3,525,813 | 8/1970 | Taylor et al. | 370/104 |
| 3,566,267 | 2/1971 | Golding | 370/104 |
| 3,816,666 | 6/1974 | Tomozawa et al. | 370/104 |
| 3,818,453 | 6/1974 | Schmidt et al. | 370/104 |
| 4,009,344 | 2/1977 | Flemming | 455/12 |
| 4,009,347 | 2/1977 | Flemming et al. | 370/104 |
| 4,054,253 | 10/1977 | Kaul | 370/104 |
| 4,320,503 | 3/1982 | Acampora | 370/104 |
| 4,397,019 | 8/1983 | Alvarez et al. | 370/104 |

OTHER PUBLICATIONS

IEEE Nat. Tele. Conf., New Orleans, LA, S. L. Kota, Demand Assignment Multiple Access (DAMA) Techniques for Satellite Communications, pp. C.8.5.4, C8.5.5.
IEEE Int. Conf. on Comm., Boulder, CO, W. G. Schmidt et al., "MAT-1: A 700-Channel Time-Division Multiple-Access System with Demand-Assignment Features", pp. 15-10.
IEEE Nat. Tele. Conf. New Orleans, LA, D. Lombard et al., "TDMA Demand Assignment Operation in Telecom 1 Business" entire article.

Primary Examiner—Douglas W. Olms
Assistant Examiner—Frank M. Scutch, III
Attorney, Agent, or Firm—Gerald R. Woods

[57] ABSTRACT

Distributed transmission control for a TDMA system including one or more user networks. A time synchronized burst modem, one at each earth station in a system, transfers TDMA frame timing signals to an interconnected data processing machine. The interconnected data processing machine is then capable of synchronizing information transfer to the time synchronized burst modem in accordance with the received TDMA frame timing signals. Accordingly, each network has available to it, at each data processing machine in the network, TDMA frame timing signals. Accordingly, optimizing information transfer can be effected on a network-by-network basis, wholly independent of overall system TDMA information transfer optimization.

6 Claims, 6 Drawing Figures

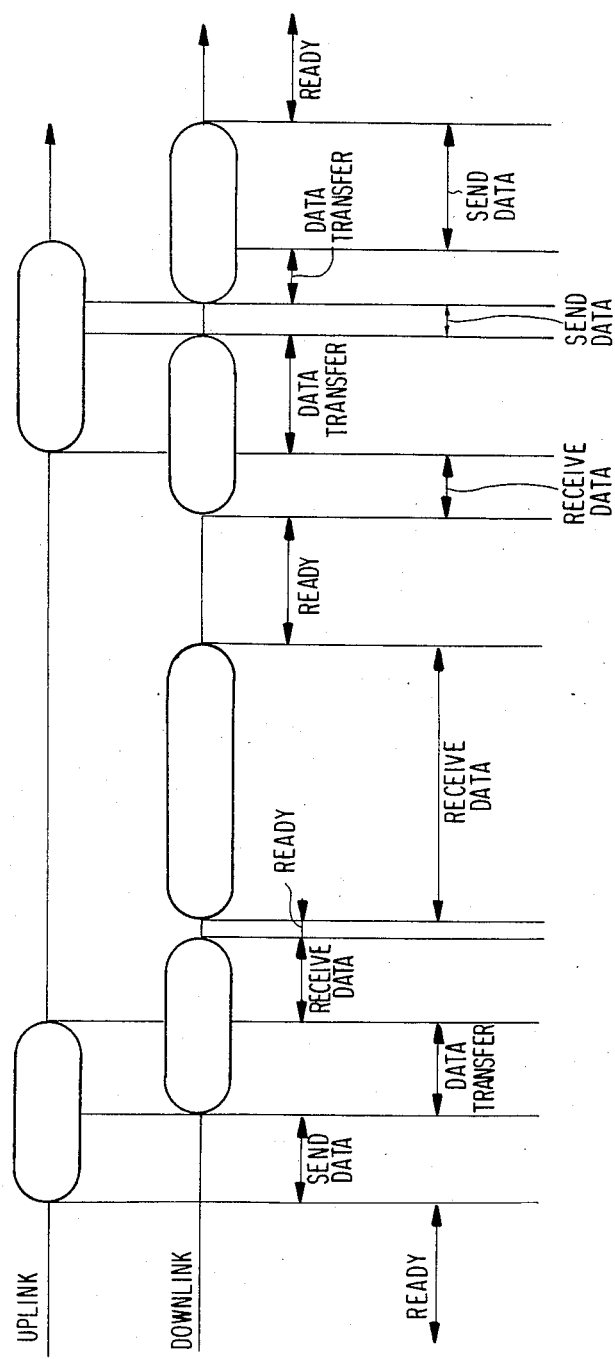

SATELLITE COMMUNICATIONS SYSTEM

DESCRIPTION

1. Technical Field

The invention relates to improvements in communication systems, and more particularly to providing increased flexibility in TDMA communications.

2. Background Art

Currently available TDMA architectures, especially those designed for use with earth orbiting satellite-carried transponders have been mainly directed at providing communication links for voice telephony. While the architectures now available are quite efficient in addressing the well-defined requirements for voice telephony, they have not been optimized for data processing applications. For example, voice telephony apportions bandwidth on a per call basis, the bandwidth required for each call is relatively small and a bidirectional channel is required. Each of a wide variety of data processing applications has unique characteristics, i.e. interactive APL, electronic mail, inquiry systems, video teleconferencing, etc. For example, electronic mail does not require a bidirectional channel and the bandwidth required is quite variable. Video teleconferencing, on the other hand, may require relatively larger bandwidth, but depending on the specific system, may require equally broad bidirectional channels, asymmetrically apportioned bidirectional channels, or simply a unidirectional channel. Because of the diversity of such data processing applications, it is impractical for a common carrier, i.e. any particular network architecture, to develop a single communications controller which is optimum for all the diverse data processing applications.

For example, one prior art architecture described in U.S. Pat. No. Re. 28,577 describes a demand assignment architecture. The demand assigned technique is carried out in a distributed manner at each respective ground station by computing the total present channel requirement for the entire transponder network, each station carrying out its own calculation of its own burst shifting increment. As described, this computation is necessarily based on limited information. The computation at any particular ground station is carried out in view of the presently-known capacity being used by each of the other ground stations as well as the relation between present allocated capacity and present demand requirements at the particular ground station.

A different demand assignment operation is described in U.S. Pat. No. 4,009,344. In this system, each station computes its own new assignment based on the presently-known demands at that location. The computed assignment is a trial assignment which is sent over an order wire channel to all other stations to determine if conflicting assignments have been made. After a predefined time delay has expired to allow for adjustments, all of the new assignments are executed simultaneously.

Other prior art demand assignment techniques includes controlling demand assignment from a central reference station which receives demand requirements from all of the outlying stations and determines the capacity to be allocated to each of the different stations.

As used in the description the word station, ground station or central station refers to a set of co-located equipment for communicating in a TDMA mode to other stations through an orbiting transponder. Thus, the station includes at least an antenna, transmitting and receiving RF equipment, a burst modem and sufficient intelligence to effect minimal TDMA required function of locating at least one burst in a predefined location in a frame (referenced at the transponder) and maintaining the burst in that position in the face of expected range variations.

Using any of the prior art techniques then, results in unnecessarily complicated systems or an inability to deliver the bandwidth required, or both. Using the central reference station to apportion bandwidth requires unnecessary communication with the central station for communicating demand factors. This adds at least delay. If the central reference is to minimally efficiently apportion bandwidth, then the type of service being implemented adds complexity and limits network flexibility. The distributed systems are no better since changing bandwidth allocations requires communicating that information to all other stations with the attendant delay. Likewise, if minimal efficiency is to be attained, the type of service must also be defined, leading to complexity and lack of flexibility.

The present invention is directed at an environment wherein a common carrier (an ensemble of geographically separated ground stations plus at least one transponder) provides space-link capacity to one or more user networks using a TDMA format. Because the common carrier is arranged to serve users whose applications may well be diverse, the common carrier provides space-link capacity to the users in an architecture which is not optimized for the different user applications. The invention further flows from a recognition that it is the user who can best control distribution of space-link capacity among the various components in the user network, and the invention is directed at providing a joint common carrier/user architecture to allow this distribution of space-link capacity to be effected by the user network.

It is therefore an object of the invention to provide a method and apparatus whereby a communication system user (such as a data processing machine) implements a communication network with other users via a TDMA system (or common carrier) which allows the network users to optimize the interchange of information among the network, independently of management of the TDMA space link.

It is another object of the present invention to provide a communication system extending from an exemplary first data processing machine, for example, originating information to an exemplary second data processing machine engaged in communications with the first data processing machine, wherein the system is comprised of two semi-autonomous subsystems, the first subsystem is a common carrier including a transponder in earth orbit and a plurality of geographically-spaced ground stations communicating among themselves via the transponder in a TDMA format, and a second semi-autonomous system composed of one or more user networks (the two exemplary data processing machines comprising an exemplary user network), wherein the two semi-autonomous subsystems manage the flow of information in a completely independent manner. That is, more particularly, the common carrier subsystem manages the data flow among the ensemble of ground station input terminals to the ensemble of ground station output terminals to optimize the same, whereas, completely independently of this optimization, each connected user network optimizes the information flow among the components of that network by apportioning the bandwidth allocated to that network among the various components of that network.

It is still another object of the present invention to provide for the operation described above which is applicable to multi-transponder configurations or to single transponder configurations, or to configurations using smaller frequency division channels within a transponder, and accordingly the invention can be effective in "large" earth stations (for example, 50 megabits per second or more), "small" earth stations (for example, 5 megabits per second or less) as well as intermediately sized earth stations.

SUMMARY OF THE INVENTION

In order to meet these and other objects of the invention, a communication system is provided wherein data processing machines in each of one or more user networks communicate through a TDMA common carrier. The common carrier equipment, to implement the TDMA operation, establishes TDMA frame timing signals. To allow the user networks to independently apportion bandwidth capacity, the common carrier equipment transfers TDMA frame timing signals defining a network's bandwidth to the user network machines. The user network includes adapter means for synchronizing information transfer through the network in accordance with the received TDMA frame timing signals.

More particularly, the adapter means referred to above, as part of the user network, includes demand assignment means for optimizing information transfer through a network independently of any optimization of data transfer by the TDMA common carrier.

The TDMA common carrier includes a satellite in earth orbit with at least one frequency changing transponder and a plurality of geographically-spaced earth stations, each for communicating with each other in a TDMA format through the transponder. The earth stations include a time base responsive to TDMA frame timing signals for generating a different pulse, defining allocated capacity of each of the user networks. The adapter means of the user network includes an interface which is responsive to that pulse for controlling information transfer from the data processing machine to the associated earth station.

Accordingly, in one aspect, the invention provides, in a communication system of the type wherein data processing machines in each of one or more user networks communicate through a TDMA common carrier, the improvement comprising:

means for transferring TDMA frame timing signals from the common carrier to at least one user network; and adapter means in said user network for synchronizing information transfer through the network in accordance with the received TDMA frame timing signals.

Thus, the invention simplifies common carrier architecture since the common carrier is no longer concerned with the particular characteristics of the user's bandwidth requirements or how that bandwidth should be distributed. The common carrier responds to a network request (one per network) for a particular bandwidth. That bandwidth is offered to each element or user in the network. The network itself apportions the allocated bandwidth in any desired manner and it is up to the user network to make that apportionment in a coordinated and non-interfering manner. However, in effecting the function, the user network is completely independent of demands of users in other networks.

Those skilled in the art will understand that in the context of the application, bandwidth is directly proportional to frame capacity, i.e. in a 50 Mbps system, allocating 20% of capacity is identical to 10 Mbps bandwidth.

Furthermore, for purposes of definition, the term "information flow" refers to the network organization or reception function. "Data flow", on the other hand, refers to the delivery of bits from source to sink. Thus, the "information" can only be interpreted by reference to the network using the same.

BRIEF DESCRIPTION OF THE DRAWINGS

The present invention will now be described in further detail so as to enable those skilled in the art to make and use the same after reviewing the following portions of the specification when taken in conjunction with the attached drawings in which like reference characters identify identical apparatus and in which:

FIG. 6 is a state diagram for the X.21 protocol.

DETAILED DESCRIPTION OF PREFERRED EMBODIMENTS

Time division multiple access, as a multiplexing technique, has been found well-suited to application with geostationary satellites, using one or more transponders to provide a wideband analog broadcast repeater connection between a set of earth stations. Within a TDMA structure, signals are originated from each participating earth station in such a way that they arrive at the satellite transponder in a non-overlapping time sequence, thus sharing the wideband broadcast repeater among a group of earth stations on a time-divided basis.

Figure 1:
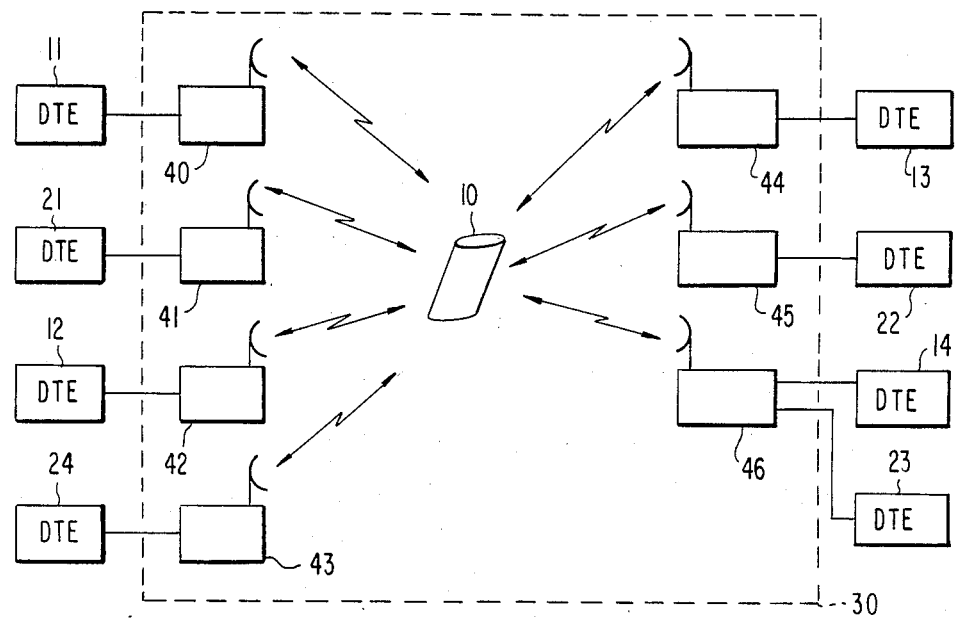
FIG. 1 is a block diagram of an ensemble of ground stations served by a single transponder.

FIG. 1 shows a representative system in which a plurality of geographically-spaced earth stations 40-46 communicate via an earth orbiting satellite 10 carrying at least one transponder. The collection of equipment located within the dashed lines 30 performs the common carrier function of providing communication services. Those communication services are provided to the users who are located outside of the dashed line 30. Illustrative users shown in FIG. 1 include data terminal equipments 11-14 and 21-24. Although most of the ground stations are shown as being coupled to but a single data terminal equipment, there is no such inherent limitation and, for example, ground station 46 is shown connected to data terminal equipment 14 and 23. For purposes of describing applications of the present invention, we will assume that the data terminal equipments comprise two independent networks, a first network 1 including data terminal equipments 11-14 and a second network 2 including data terminal equipments 21-24. It should also be apparent that the illustration of two networks is merely exemplary, indeed there is no limitation other than bandwidth on the number of networks served by a transponder.

Figure 2:
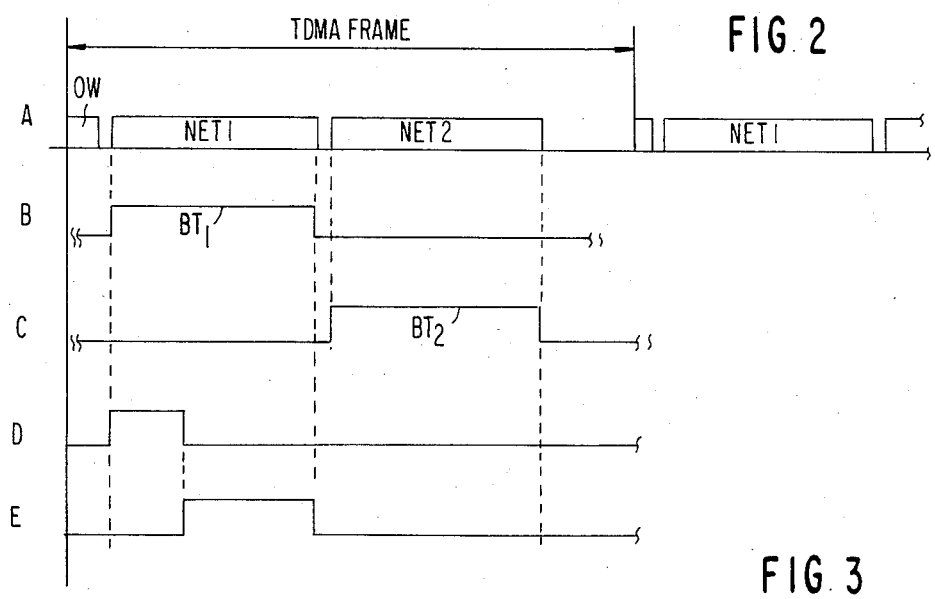
FIG. 2 is a timing diagram illustrating how a TDMA frame is broken up by network and within a network.

TDMA systems provide for a cyclical time frame. As will be described, that time frame includes, in the example of FIG. 1, three distinctive components: a first period set aside for network 1 communication; a second exclusive period set aside for network 2 communications and a third period, exclusive of the first two, effecting the function of an order wire. The order wire is used by the common carrier to establish and maintain a synchronized TDMA structure and would include time for reference bursts, preamble, carrier recovery, etc. These portions of the TDMA frame are represented in FIG. 2, line A, where the reference characters OW represent the order wire time.

It is a prime objective of the invention to allow the common carrier (represented by equipment located within the dash line 30) to manage, independently of any other equipment, operation of the TDMA communications and at the same time allow the user networks (located outside the dash line 30) to independently manage information flow among the data terminal equipments. Reference to data terminal equipments should be understood as exemplary of a wide variety of sources of digital information which can be employed in a variety of applications with vastly differing communication service needs. In accordance with the invention, those functions germane to common carrier's operation (such as managing the space link and providing customers with access to a contracted amount of raw transmission capacity) are administered independently from those functions which are germane to a data processing operation (such as controlling the exchange of information between data processing machines in an optimum fashion).

In meeting these objectives, the common carrier equipment includes, at each of the earth stations, a time synchronized burst modem (TSBM) for managing the space link and dispensing transmission capacity to attached data terminal equipments. Cooperating with the TSBM and associated with the data terminal equipments is a communications adapter which, in conjunction with its host data terminal equipment, manages the use of the transmission capacity to maintain optimum information flow for the particular application being implemented.

As will be described hereinafter, the TSBM presents a wideband digital TDMA broadcast channel to the attached communication adapter. The full network capacity (measured for example in bits per second) is available to each of the communication adapters in any network. The network is therefore able to allocate this capacity dynamically among the communicating data terminal equipments using application-specific algorithms for scheduling transmission over the digital TDMA broadcast channel. The TSBM, of course presents a different (time divided) TDMA broadcast channel to members of different networks to which it is connected.

Each TSBM is informed, via the order wire, of the network allocation for each network as well as the position, in the frame, of the allocated bandwidth. The duration and location of the network capacity is translated into a unique frame timing signal for each network.

As an example, consider a network with ten DTE's and a network bandwidth of three megabits per second. This network capacity can be evenly divided, i.e. 300 kilobits per second to each DTE at one time, and at a later time one megabit per second can be assigned to each of two different DTE's and 125 kilobits per second can be assigned to the remaining eight machines. The assignment of this capacity, then, can be effected in a fashion to optimize the information flow among the network. The common carrier, i.e. the TSBM plays no part in allocating capacity within any network.

In order to enable each DTE in a network to use its allocated portion of the network capacity, the TSBM associated with the particular DTE presents time keeping information to the adapter associated with the DTE. For example, the TSBM may present to each adapter to which it is connected, a pulse whose duration corresponds to the network's total allocated capacity and timed, at each of the ground stations, to coincide with the network's portion of the TDMA frame. Because the TDMA frame can be used to isolate one network's capacity from another, the furnishing of this time-keeping information to the adapter provides a technique for the common carrier to maintain isolation and independence of different networks and to divide a bulk capacity (for example an entire transponder or a frequency-divided channel therein) among multiple independent networks. In addition, because the TDMA time-keeping information implicitly has tracked and compensated for doppler shifts and diurnal changes in satellite position, the attached DTE is relieved of the burden of implementing these functions and is provided with a precise timing structure within which to schedule its transmissions in an effective time order.

Figure 3:
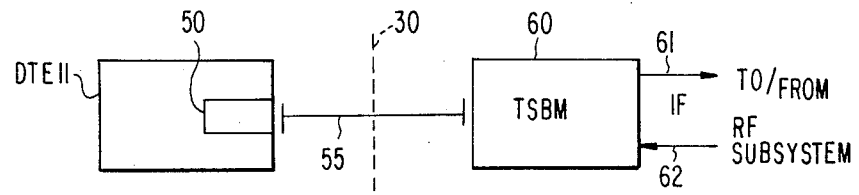
FIG. 3 is a block diagram of a particular data terminal equipment and its interface to a burst modem.

FIG. 3 shows a typical TSBM at any particular earth station which on one side couples IF output and input over conductors 61 and 62, respectively, to/from the ground station's RF subsystem (not shown). On the other side, the TSBM makes available, via a baseband interface 55, the referred-to time-keeping information to the attached DTE 11, and more particularly to an adapter 50 associated therewith. As in the case with FIG. 1, the dash line 30 represents the interface between the network user and the common carrier. The TSBM 60 is responsible for executing carrier-related functions and is independent of the specific data processing applications being run in the various DTE's. The TSBM manages the space link in such a way that the carrier can provide transmission capacity to multiple networks and can guarantee isolation between different networks while still permitting each network to separately optimize information exchange between member machines. The TSBM's can together, be used to implement any of the known demand assignment procedures. On the other hand, the communications adapter, such as adapter 50, manages the flow of information between the associated DTE and other DTE's in the network in an application-specific manner under control of the network. Of course, this function is accomplished by the ensemble of communication adapters associated with the different DTE's in a particular network. The adapters are in communication with one another through the common carrier provided communication link. The baseband interface 55 presents the digital wideband broadcast TDMA channel to the attached DTE.

Figure 4:
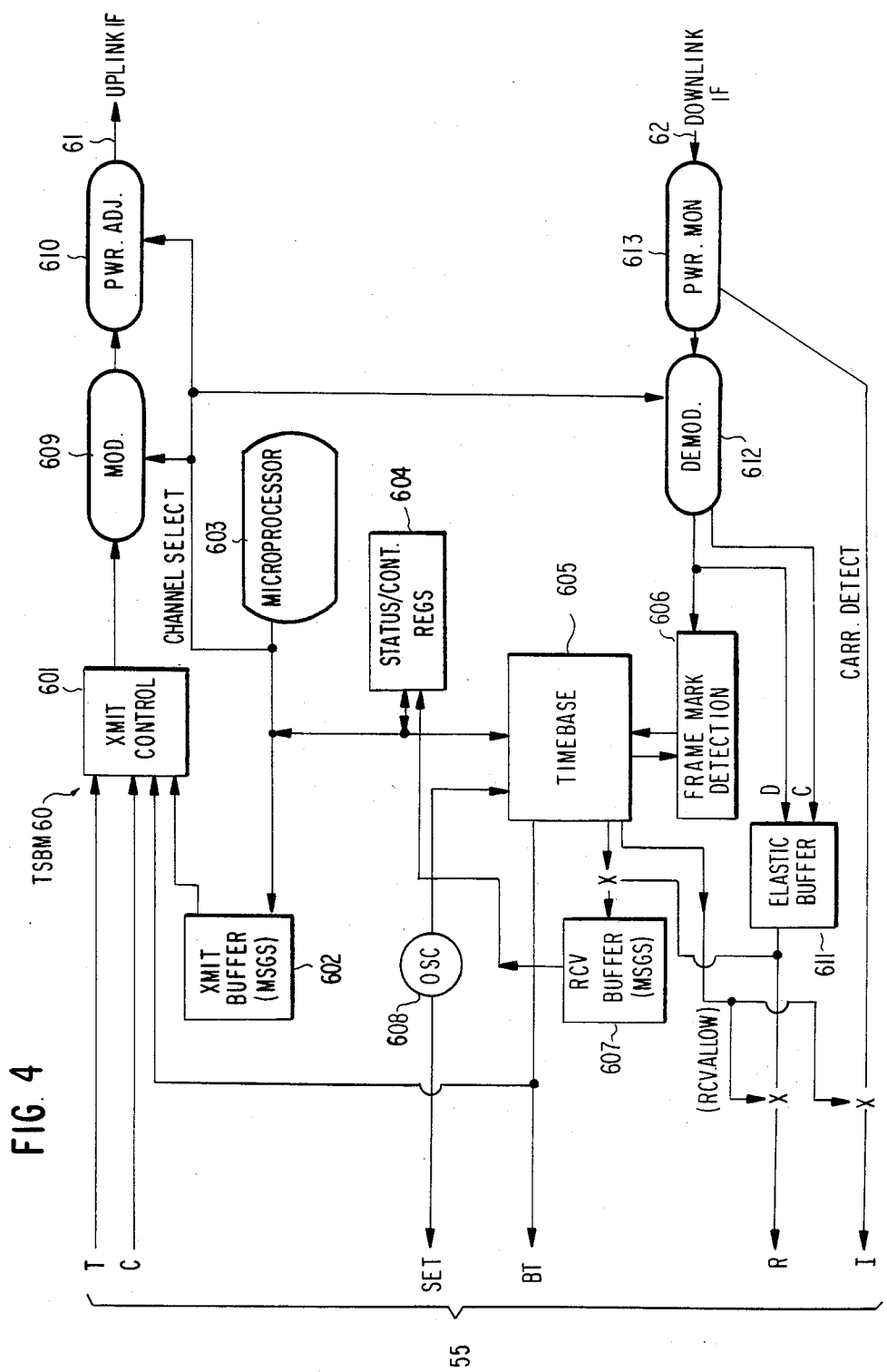
FIG. 4 is a block diagram of a burst modem.

FIG. 4 is a block diagram of a preferred embodiment for the time-synchronized burst modem (TSBM), such as the TSBM 60. The TSBM is the system element which manages and controls the space link, and effects this function independent of the applications being run by any particular user. It executes and controls those functions which relate to the establishment and maintenance of a space link transmission facility. The functions performed by the TSBM include burst modulation and demodulation, RF power control, if desired, network time-keeping, space link/TSBM diagnostics, transmission capacity dispensing and the corollary of user isolation.

As shown in FIG. 4, a transmit control element 601 is subjected to four input signals, data for transmission T, a control signal indicating valid data C, the frame timing signals BT and an input from a transmit message buffer 602. The transmit message buffer 602 can be used for transmission of the burst preamble and other common carrier housekeeping signals. The transmit control element 601 passes on valid signals to a modulator 609 which, in addition, receives a channel select signal on another input. The output of modulator 609 may be fed to a power adjust circuit 610, and the output 61 forms the IF input to the RF subsystem.

Valid data at the transmit control 601 is either data from the transmit buffer 602 or the input T which was validated by the control signal C in the presence or BT.

An oscillator 608 provides a signal SET (signal element timing) to the interface 55 and also drives a time base 605. The time base 605 generates TDMA timing signals including the frame timing.

A microprocessor 603, operating in conjunction with status/control register 604, performs the TDMA functions of ranging, open loop synchronization, space link monitoring, window dispensing and burst modem diagnostics. Any demand assignment procedure could be employed by the common carrier equipment.

In the downlink path, the downlink IF received from the RF subsystem is coupled via an input 62 to a power monitor 613. The power monitor provides a carrier detect signal which is gated with a window generated in the time base 605 to produce the I (receive data valid) signal to the interface 55. The other output of the power monitor circuit 613 is input to a demodulator 612 which is also subject to a channel select signal generated by the microprocessor 603.

The output of the demodulator 612 provides an input to a frame mark detection circuit 606. The frame mark detection circuit 606 cooperates with the time base 605 (as well as the microprocessor 603) to compensate for variations in transponder range, etc.

The demodulator 612 also provides an output to an elastic buffer 611. The elastic buffer is read out via the time base 605 so as to smooth phase jitter, etc. The receive buffer 607 provides one sink for the output of the elastic buffer 611. Using the receive buffer 607, a path is provided for an order wire to the microprocessor 603. In addition, and as gated by the time base 605, the output of the elastic buffer provides the received data R to the interface 55.

Since the TSBM is informed by the position and duration of network capacity, as described above, it is simple to generate a pulse corresponding to the allocated capacity. Since all frame timing signals at the TSBM are corrected for transponder range and range variations, the microprocessor 603 can command time base 605 to generate an appropriate BT pulse for any network.

From the foregoing, it should be apparent that the time synchronized burst modem 60 manages the space link for the particular user attached at the interface 55. The network user attached at the interface 55 is offered, via the pulse BT, a gating signal defining the entire bandwidth of the network. Line B of FIG. 2 shows the pulse BT which is made available to users in network 1; line C of FIG. 2 illustrates a signal BT made available to users of network 2. Of course the timing in FIG. 2 is representative of the pulses BT which can be made available at a single station; relative time variations required by range differences and transponder range changes are accounted for by the space link management effected by the burst modem 60. From the absence of buffers in the burst modem, it should be apparent that the transmit data T as well as the receive data R are provided at the TDMA burst rate although if desired, rate changing (or burst) buffers could be included with TSBM 60.

Figure 5:
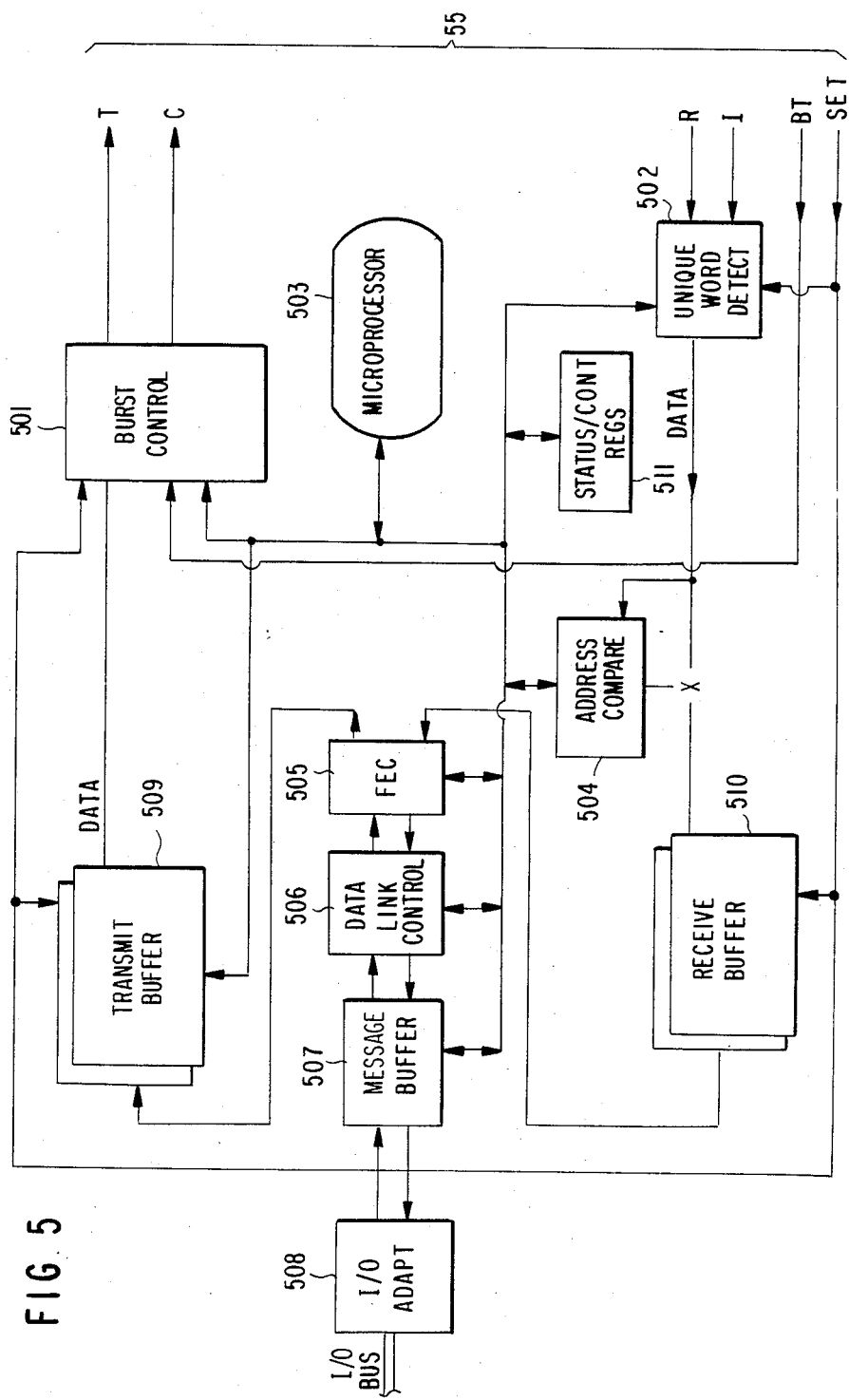
FIG. 5 is a block diagram of an adapter.

Reference to FIG. 5 illustrates a block diagram for a preferred form of the adapter 50.

On the transmit side, an I/O bus is coupled to an I/O adapter 508. A bidirectional path couples the I/O adapter 508 to a message buffer 507. The message buffer 507 is coupled via a bidirectional path to a data link control 506, which is in turn coupled via another bidirectional path to a forward acting error correction module 505. Each of the modules 505-507 operates under control of the microprocessor 503. The forward acting error correction module 505 provides, in the transmit path, for forward acting error correction encoding, and in the receive path, for forward acting error correction decoding. In the transmit path, the output of the forward acting error correction module 505 is an input to a transmit buffer module 509. Reading from the transmit buffer 509 is clocked by the SET (received via the interface 55 from TSBM 60). Under control of the microprocessor 503, the transmit buffer 509 is read out, and the data thus read out is supplied as one input to a burst control circuit 501, which is also clocked via the SET. A control input to the burst control 501 is BT from interface 55. Finally, the microprocessor 503 provides another input to the burst control 501.

The block diagram of FIG. 5 implies that the transmit buffer 509 comprises at least a pair of buffer modules so that when one module is being read out, the other is available for a writing function. The transmit buffer 509 provides for rate changing, changing the data rate at the input side to the burst rate at the output side.

The burst control 501 provides for two levels of control. The BT signal ensures that no output from the burst control 501 is possible in the absence of BT. On the other hand, the microprocessor 503, via a scheduling process (carried out with other like microprocessors in other adapters located at other stations), apportions the network bandwidth and allows the burst control 501 to output data only during that portion of the network bandwidth which is allocated to the particular machine in which the adapter exists.

On the receive side, the R and I signals from interface 55 are input to a unique word detector 502. The unique word detector 502 provides a time mark for byte timing. After stripping the unique word, the remaining data is provided to an address comparator 504. At the address comparator 504, a gating signal is generated to allow data to flow to the receive buffer 510 only if it is addressed to the particular machine in which the address comparator 504 is present. Accordingly, traffic destined for the particular machine associated with the adapter shown in FIG. 5 is coupled to the receive buffer 510. The receive buffer 510 includes a pair of modules for the same reasons as specified above with respect to the transmit buffer 509.

The output of the receive buffer 510 is then coupled, in the receive chain, through the forward acting error correcting module 505, the data link control 506 and the message buffer 507 to the I/O adapter 508.

The microprocessor 503, in cooperation with the status control registers 511, provides for scheduling, prioritizing, data link control, adapter diagnostics and interfacing with the particular application program.

Each adapter 50 is in communication with other adapters through the TDMA network. More particularly, as shown in FIG. 5, messages originating at the microprocessor 503 can be inserted into the message buffer 507 for transmission. Likewise messages from the adapters 50 are received, coupled to message buffer 507 and then to microprocessor 503. With communication available, the microprocessors 503 can implement any conventional bandwidth assignment technique to allocate network bandwidth among the various network users. Thus, each microprocessor 503 can limit data transfer via burst control 501 to that part of the network bandwidth allocated to the particular user.

The interfacing embodiment shown in detail in FIGS. 4 and 5 is an example of how the X.21 protocol can be adapted to interface the adapter 50 and the TSBM 60. The different states in the X.21 protocol are defined as ready, send data, data transfer and receive data. FIG. 6 illustrates these various states. The condition of the C and I signals determines the particular state, however, certain rules are required in case of simultaneous transitions in these signals. For example, the send data state is defined as the state during which data is being transmitted, the receive data state is defined as the state during which data is being received, and the data transfer state is defined as the state during which both transmission and reception is being effected. If the interface is in a data transfer state, and both the C and I controls go from on to off, the transition from data transfer to ready is via the receive data state. On the other hand, if the interface is in the ready state and simultaneously both the C and I control signals go from off to on, then the transition is from ready to receive data to data transfer.

Finally, if in the send data or receive data states, and the control signals change simultaneously, any transition is made through the data transfer state.

Turning back to FIG. 2, and assuming that the adapter 50 is part of network 1, then line D of FIG. 2 illustrates a portion of the allocated network capacity for network 1 which can be allocated to a particular adapter. Under those circumstances, line E illustrates the remaining portion of the network capacity of network 1 which can be allocated to another user or users in that network.

From the preceding, it should be apparent that the invention provides for a generalized common carrier architecture which is not at all personalized for particular data traffic characteristics, but which provides, to the various attached users, sufficient information so that each network can, independently of the common carrier, optimize data transfer among the various components in the network which at the same time assures that although plural networks may utilize a single transponder, each network is isolated one from another.

The transponder 10 (see FIG. 1) can of course be located on a single orbiting vehicle with other similar transponders 10. Each of the transponders can provide their full bandwidth to the networks shown in FIG. 1 or, in the alternative, a transponder can be divided into a collection of independent frequency division multiplex channels. Each of these independent frequency division channels can then be shared between a plurality of networks as described herein. Furthermore, it is not of course necessary that each of the independent channels in the transponder be assigned to plural networks.

I claim:

1. In a communication system of the type wherein data processing machines in each of one or more user networks communicate through a TDMA common carrier including a satellite in earth orbit with at least one transponder and a plurality of geographically spaced earth station means, each for communicating with other of the earth station means in a TDMA format through the transponder, the improvement comprising:

means for transferring TDMA frame timing signals from the common carrier to each of the user networks, said transferring means including, at each earth station, time base means responsive to TDMA frame timing signals for generating a pulse defining allocated capacity of a particular one of said user networks; and adapter means in each user network for synchronizing information transfer through the network in accordance with received TDMA frame timing signals.

2. The system of claim 1 wherein said adapter means includes interface means at each said data processing machine in a network responsive to said pulse for controlling information transfer from said data processing machine to said earth station means.

3. An interface for an earth station communicating in a TDMA network to other geographically spaced earth stations for interconnecting a plurality of data processing machines, said earth stations collectively supporting at least two independent networks of data processing machines, said interface including:

means for transforming TDMA frame timing signals from said earth station to a connected data processing machine, said transferring means generating a frame timing signal for each of the networks which is non-overlapping in time with the frame timing signal for any other network;

adapter means associated with said connected data processing machine for controlling information transfer to said earth station in accordance with said TDMA frame timing signals; and means for coupling to said connected data processing machine a selected one of said frame timing signals corresponding to the network in which said attached data processing machine is connected.

4. A method of communicating in a TDMA format via a geosynchronous orbiting transponder between a plurality of geographically separated earth stations supporting communications between data processing machines in a plurality of independent networks comprising the steps of:

providing synchronized frame timing signals at each of said earth stations, generating, at each earth station, a network unique frame timing signal for at least those networks having a data processing machine served thereby, said network unique frame timing signal defining that portion of a frame presently allocated to the associated network, whereby at any earth station each network unique frame timing signal is exclusive of any other network unique frame timing signal, transferring an appropriate network unique frame timing signal to each data processing machine, and gating transmissions of each data processing machine to said earth station during a time period wholly within the network unique frame timing signal transferred thereto.

5. The method of claim 4 which includes the further step of:

allocating, at a data processing machine in any network, the network unique frame timing signal, among the various data processing machines in the network, communicating said allocation via said earth station-transponder to all data processing machines within the network, and at each data processing machine in the network limiting that data processing machine transmission to that allocated capacity.

6. In a communication system of the type wherein data processing machines in each of one or more user networks communicate through a TDMA common carrier, the improvement comprising:

means for transferring TDMA frame timing signals from the common carrier to each of the user networks; and adapter means in each user network for synchronizing information transfer through the network in accordance with the received TDMA frame timing signals, said adapter means including demand assignment means for optimizing information transfer through a network independently of any optimization of data transfer by the TDMA common carrier.

* * * * *